United States Patent
SeyedzadehDelcheh et al.

(10) Patent No.: US 12,400,038 B2
(45) Date of Patent: Aug. 26, 2025

(54) DATA INTEGRITY VERIFICATION SYSTEM AND METHOD

(71) Applicant: ADVANCED MICRO DEVICES, INC., Santa Clara, CA (US)

(72) Inventors: SeyedMohammad SeyedzadehDelcheh, Bellevue, WA (US); Wei Chen, Camas, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 267 days.

(21) Appl. No.: 18/212,856

(22) Filed: Jun. 22, 2023

(65) Prior Publication Data
US 2024/0427938 A1 Dec. 26, 2024

(51) Int. Cl.
*G06F 21/64* (2013.01)
*H04L 9/32* (2006.01)

(52) U.S. Cl.
CPC ............ *G06F 21/64* (2013.01); *H04L 9/3242* (2013.01)

(58) Field of Classification Search
CPC ............................... G06F 21/64; H04L 9/3242
See application file for complete search history.

(56) References Cited

U.S. PATENT DOCUMENTS

| | | | | |
|---|---|---|---|---|
| 5,754,567 A | * | 5/1998 | Norman | G06F 11/1068 714/E11.038 |
| 2004/0143739 A1 | * | 7/2004 | de Jong | G06F 21/64 713/176 |
| 2009/0141887 A1 | * | 6/2009 | Yap | H04L 63/12 380/28 |
| 2012/0288086 A1 | * | 11/2012 | Schaffer | G06F 7/724 380/28 |
| 2017/0359168 A1 | * | 12/2017 | Hutter | G09C 1/00 |
| 2018/0211064 A1 | * | 7/2018 | Ndu | G06F 21/78 |
| 2019/0042359 A1 | * | 2/2019 | Durham | G09C 1/00 |
| 2021/0201308 A1 | * | 7/2021 | Chatterjee | G06Q 20/401 |

(Continued)

OTHER PUBLICATIONS

J. Katz et al., in "Aggregate message authentication codes", in Proceedings of the 2008 The Cryptopgraphers' Track at the RSA conference on Topics in crytology, Tal Malkin (ed.). Springer-Verlag, Berlin, Heidelberg, 2008.*

(Continued)

*Primary Examiner* — Steve N Nguyen

(57) ABSTRACT

A processing system uses a residue code-based mechanism to verify data integrity while storing check bits generated using Message Authentication Codes (MACs) at memory locations that traditionally store error correcting code data. Cache data is received from a cache line. Check bits are generated from the cache data and the cache data and check bits are stored at a memory device. Subsequently, the cache data and check bits are retrieved from the memory device. A first MAC hash value is generated from the previously stored cache data and second check bits are generated from the first MAC hash value. A second MAC hash value is generated from the previously stored check bits. The second MAC hash value is compared to the second check bits to verify data integrity of the previously stored cache data. In some implementations, the previously stored check bits are additionally used as error correcting code data.

20 Claims, 5 Drawing Sheets

(56) References Cited

U.S. PATENT DOCUMENTS

2022/0414227 A1* 12/2022 Belenky ............... H04L 9/0643
2024/0214213 A1*  6/2024 Hamada ............... H04L 9/008

OTHER PUBLICATIONS

Chien, R., "On linear residue codes for burst-error correction," IEEE Transactions on Information Theory, 1964, 7 pages.
Costan, V. et al., "Intel SGX Explained," International Association for Cryptologic Research, Cryptology ePrint Archive, 2016, 118 pages, URL: <https://ia.cr/2016/086>, Accessed Aug. 24, 2023.
Fakhrzadehgan et al., "SafeGuard: Reducing the Security Risk from Row-Hammer via Low-Cost Integrity Protection," IEEE International Symposium on High-Performance Computer Architecture (HPCA), 2022, 14 pages. DOI 10.1109/HPCA53966.2022.00035.
Gueron, Shay, "Memory encryption for general-purpose processors," IEEE Computer and Reliability Societies, 2016, 9 pages.
Henderson, D. S., "Residue class error checking codes," Proceedings of the 1961 16th ACM national meeting, 1961, 4 pages.
Huang, R. et al., "Ivec: Off-chip memory integrity protection for both security and reliability," ISCA, 2010, DOI: 10.1145/1815961.1816015, 13 pages.
Manzhosov, E. et al., "Revisiting Residue Codes for Modern Memories," 55th IEEE/ACM International Symposium on Microarchitecture (MICRO), 2022, DOI 10.1109/MICRO56248.2022.00020, 18 pages.
Rooney, R. et al., "Micron DDR5 SDRAM: New Features," Micron Technology, Inc, Tech. Rep., 2019. 6 pages.
Saileshwar, G. et al., "Synergy: Rethinking secure-memory design for error correcting memories," IEEE International Symposium on High Performance Computer Architecture (HPCA), 2018, 12 pages.
JEDEC, JEDEC Standard, DDR5 SDRAM, JESD79-5, JEDEC Solid State Technology Association, Jul. 2020, 496 pages.

* cited by examiner

DATA INTEGRITY VERIFICATION SYSTEM AND METHOD

BACKGROUND

When processing systems store cache data in a memory device (e.g., a system memory), in some cases, the data subsequently retrieved from the memory device differs from the cache data stored at the memory device. For example, hardware errors at the memory device or errors during transfer of the data result in data bits being changed. As another example, unauthorized (e.g., malicious) actors change the data bits. In some cases, the differing data bits cause undesirable events such as reduced performance (e.g., because of procedures implemented to correct data bits) or system failures.

To detect modifications of data and verify data integrity, processing systems often use cryptographic data signatures called Message Authentication Codes (MACs), also referred to as authentication tags or Message Integrity Codes (MICs). When cache data associated with a MAC is stored in a memory device, the MAC is generally also stored in the memory device. As a result, the MAC consumes an undesirable amount of data in the memory device and consumes an undesirable amount of bandwidth being transferred between a cache and the memory device. Further, the MAC is generally stored at a separate location within the memory device from the associated data. As a result, the memory device performs multiple memory accesses to retrieve the data and the MAC, leading to an undesirable amount of overhead to retrieve the data.

Error Correcting Code (ECC) data, which differs from MACs, is used to recover data even if some bits are changed. ECC data is generally stored with and transmitted with cache data. Accordingly, in some memory device designs, ECC data is stored at designated memory locations adjacent to corresponding cache data, and thus is transferred with fewer memory device accesses, as compared to data stored separately from corresponding cache data. However, ECC data does not indicate data integrity.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

A processing system uses a Residue Code (RC) based mechanism to verify data integrity while storing check bits generated using MACs at memory locations that traditionally store ECC bits. Further, in some implementations, the check bits are used as ECC bits to perform both data integrity verification and error detection and correction.

For example, in some implementations, in response to receiving cache data to be stored at a memory device (e.g., a system memory or another cache), the check bits are generated from the cache data using a RC encoder. The cache data is stored at an entry of the memory device and the check bits are stored in an ECC memory location of the entry. Subsequently, when the cache data and the check bits are retrieved, in some cases, errors are present in the cache data, the check bits, or both. A first MAC hash value is generated by a MAC circuit using the received cache data. A second MAC hash value is generated by the MAC circuit using the received check bits. A second set of check bits are generated using the first MAC hash value. The first and second MAC hash values are generated using hash functions which are selected such that, if data integrity is preserved, the second MAC hash value matches the second set of check bits. In other words, if data integrity is preserved, $RC2(HF1(X)) = HF2(RC1(X))$ where RC1 and RC2 are RC-based functions used to generate the check bits, HF1 and HF2 are hash-based MAC functions, and X is the example data. In some implementations, RC1 and RC2 are different functions, HF1 and HF2 are different functions, or both. In some implementations, RC1 and RC2 are the same function, HF1 and HF2 are the same function, or both. Further, in various implementations, the check bits received from the memory device are used to perform traditional ECC functions.

As a result, the system discussed herein performs data integrity verification without storing additional MAC data at a memory location separate from an entry that stores the associated data, reducing memory utilization and bandwidth, and, in some cases, reducing a number of read accesses at the memory device. Further, in some implementations, the system performs ECC functions without storing additional data at the memory device.

The techniques described herein are, in different implementations, employed using any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). For ease of illustration, reference is made herein to example systems and methods in which processing circuits are employed. However, it will be understood that the systems and techniques described herein apply equally to the use of other types of parallel processors unless otherwise noted.

Figure 1:
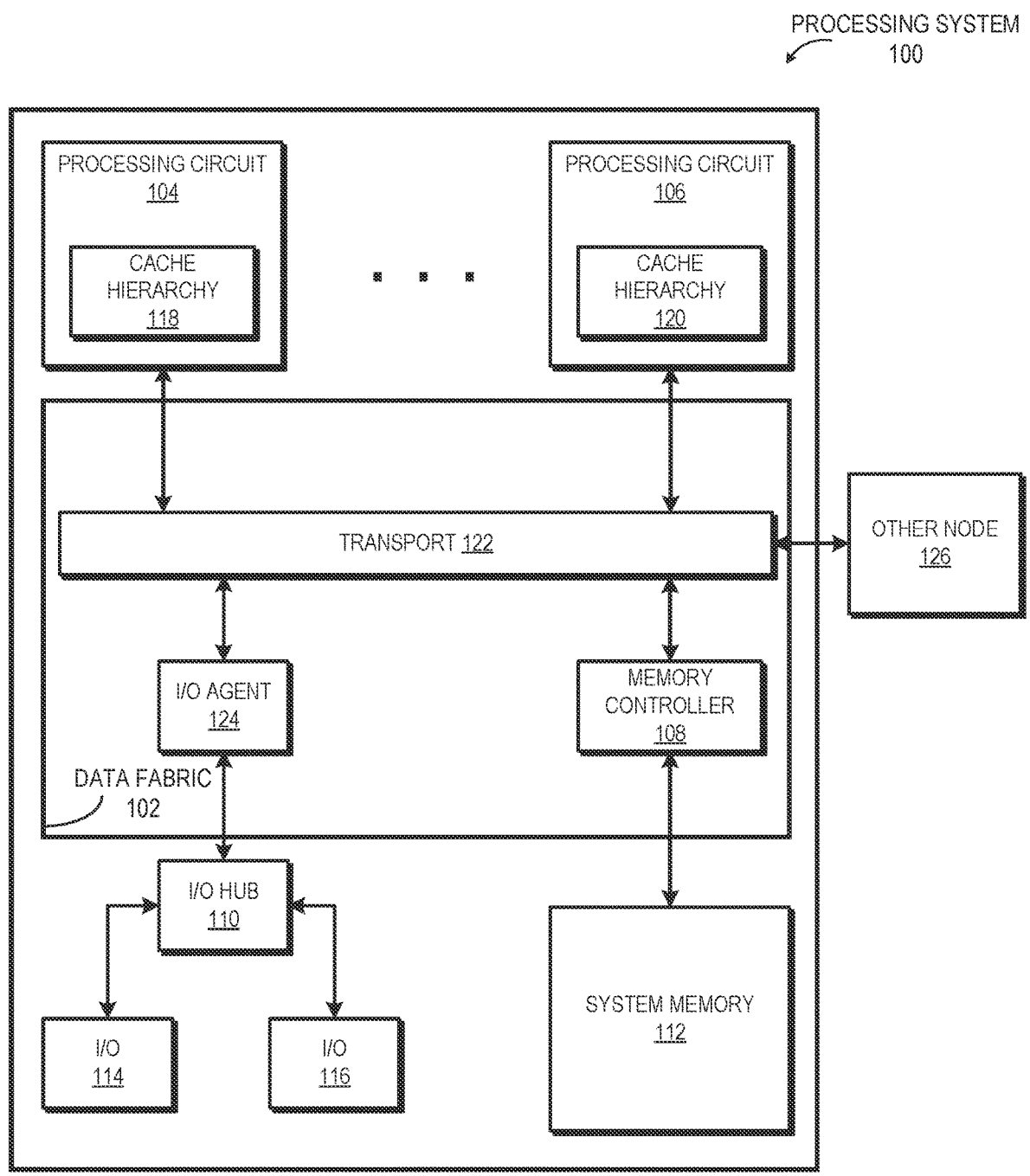
FIG. 1 is a block diagram of a processing system that includes a data integrity verification system in accordance with some implementations.

FIG. 1 illustrates a processing system 100 that verifies data integrity in accordance with at least some implementations. The processing system 100 includes a data fabric 102 used to interconnect various components of processing system 100, including a plurality of processing circuits, such as processing circuits 104-106, one or more memory controllers 108, and one or more I/O hubs 110. Each memory controller 108 is coupled to one or more memory devices such as system memory 112, and each I/O hub 110 is in turn coupled to one or more I/O devices, such as I/O devices 114-116.

Processing circuits 104-106 include one or more processor cores and a local cache hierarchy. In the illustrated implementation, processing circuit 104 includes cache hierarchy 118 and processing circuit 106 includes cache hierarchy 120. The processor cores include, for example, CPU cores, GPU cores, DSP cores, parallel processor cores, or a combination thereof. The local cache hierarchy of a processing client includes one or more levels of cache, which include respective cache lines configured to store cache data. In some implementations, at least one of processing circuits 104-106 differs from at least one other of processing circuits 104-106 (i.e., processing circuits 104-106 are heterogeneous). In other implementations, processing circuits 104-106 are homogeneous.

Memory controller 108 operates as an interface between the corresponding system memory 112 and the other components of processing system 100. Thus, data to be cached in a local cache hierarchy of a processing client typically is manipulated as blocks of data referred to herein as "cache data", and which are addressed or otherwise stored in a memory hierarchy using a physical address of system memory 112. Cache data is accessed from system memory 112 by memory controller 108 in response to access requests from a processing client, and the cache data is stored, or cached, in one or more caches of the processing client. As described above, in some cases, data retrieved from system memory 112 differs from the cache data stored at system memory 112. Accordingly, in some cases, the data retrieved from a memory device is referred to herein as "memory device data" for clarity. When cache data containing modified data is evicted from a local cache hierarchy of a processing client, and thus needs to be updated in system memory 112, memory controller 108 manages this writeback process. In some implementations, as described further below, memory controller 108 verifies data integrity of data being retrieved from system memory 112 using an RC mechanism, performs ECC functions on the data, or both. In some implementations, processing system 100 includes multiple system memories 112.

I/O devices 114-116 operate to transfer data into and out of processing system 100 using DMA access operations. For example, in some implementations, one of I/O devices 114-116 includes a network interface card (NIC) for connecting the node to a network for receiving and transmitting data, or hard disk drive (HDD) or other mass storage device for non-volatile storage of relatively large quantities of data for use by processing circuits 104-106, and the like. In at least one implementation, I/O hub 110 manages I/O devices 114-116 and serves as an interface between data fabric 102 and I/O devices 114-116. To illustrate, in some implementations, I/O hub 110 includes a Peripheral Component Interconnect Express (PCIe) root complex so as to operate as a PCIe interconnect between I/O devices 114-116 and data fabric 102.

Data fabric 102 transports commands, data, requests, status communications, and other signaling among the other components of processing system 100, and between processing system 100 and other nodes 126. One such subset of these transport operations is the storage of data provided by the I/O devices 114-116 at system memory 112 for use by one or more of processing circuits 104-106. As discussed further with respect to FIGS. 2-5, in some cases, the cache data stored at cache hierarchy 118 or cache hierarchy 120 is stored at system memory 112 via data fabric 102 and then is subsequently retrieved and verified before being sent back to one of cache hierarchy 118 or cache hierarchy 120 via data fabric 102. I/O agent 124 operates as a coherent agent for I/O hub 110 and I/O devices 114-116. Further, in some implementations, transport layer 122 is coupled to the corresponding transport layer of one or more other nodes 126 or to processing circuits 104-106 via one or more bridge components or coherent agents (not shown). In various implementations, data fabric 102 is compatible with one or more standardized interconnect specifications, such as a HyperTransport™ specification or an Infinity Fabric™ specification.

Figure 2:
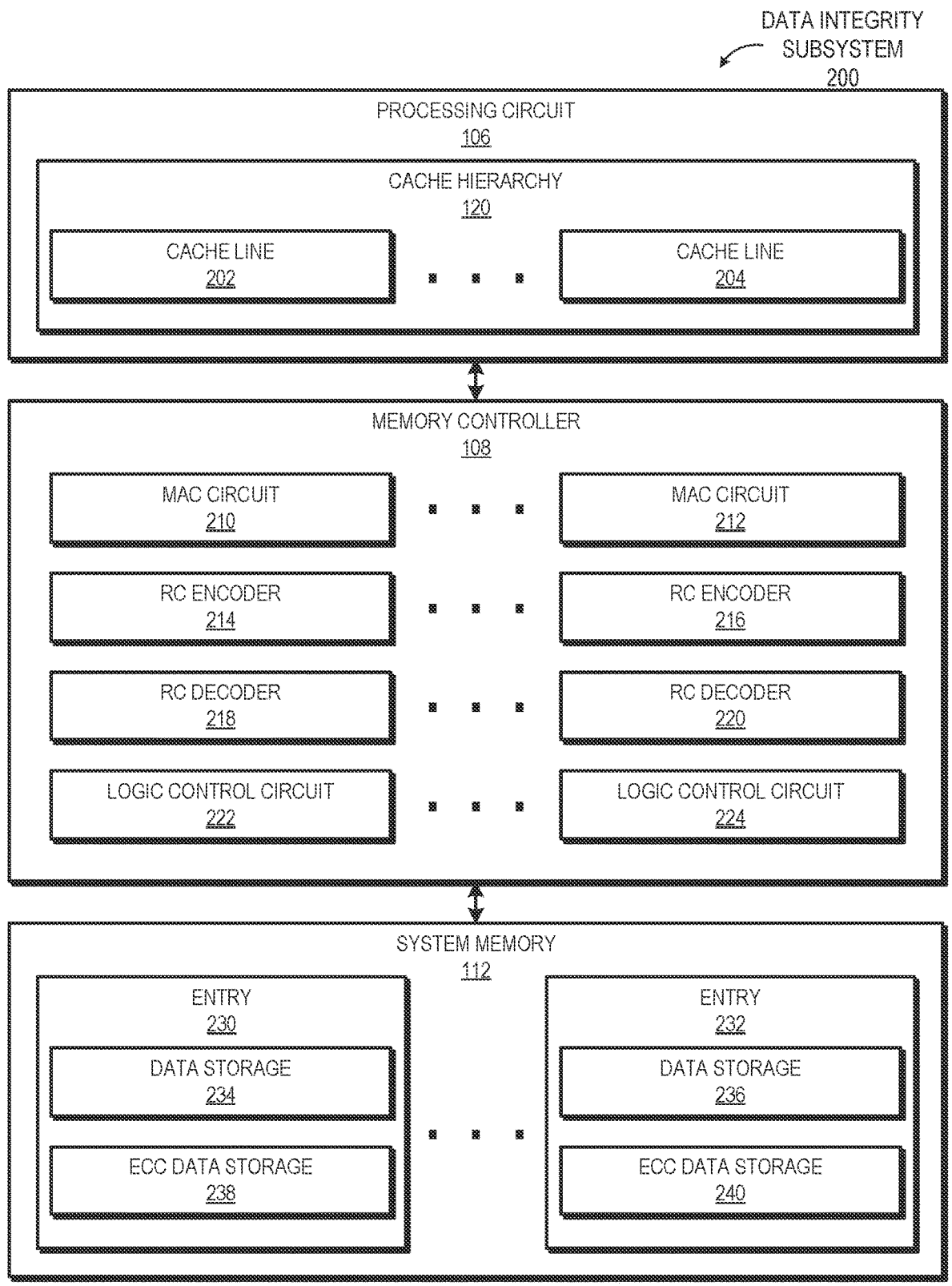
FIG. 2 is a block diagram of a data integrity subsystem that is used to perform data integrity verification in accordance with some implementations.

FIG. 2 is a block diagram illustrating a data integrity subsystem 200 that is used to perform data integrity verification in accordance with some implementations. In the illustrated implementation, data integrity subsystem 200 includes a subset of processing system 100. In other implementations, data integrity subsystem 200 corresponds to a different processing system that includes additional or fewer components than processing system 100. In the illustrated implementation, data integrity subsystem 200 includes processing circuit 106, memory controller 108, and system memory 112. Processing circuit 106 includes cache hierarchy 120, which includes cache lines 202-204. Memory controller 108 includes MAC circuits 210-212, RC encoders 214-216, RC decoders 218-220, and logic control circuits 222-224. System memory 112 includes entries 230-232. Entry 230 includes data storage 234 and ECC data storage 238. Entry 232 includes data storage 236 and ECC data storage 240. Although the illustrated implementation shows a specific configuration of components, in various implementations, other combinations or arrangements of components are contemplated. For example, in some implementations, memory controller 108 only includes a single MAC circuit 210, a single RC encoder 214, a single RC decoder 218, and a single logic control circuit 222. As another example, in some implementations, one or more of MAC circuits 210-212, RC encoders 214-216, RC decoders 218-220, logic control circuits 222-224, or any combination thereof are located in processing circuit 106 instead of memory controller 108. Similarly, in some implementations, one or more of MAC circuits 210-212, RC encoders 214-216, RC decoders 218-220, logic control circuits 222-224, or any combination thereof are located in system memory 112 instead of memory controller 108. Further, in some implementations, additional components such as buffers or data fabric 102 of FIG. 1 are included but not illustrated for ease of discussion.

Processing circuit 106 executes various programs. Data for at least some of those programs is stored in cache lines 202-204 of cache hierarchy 120. In some cases, cache data is evicted from a cache line. In response to the eviction of the cache data, processing circuit 106 sends the cache data to system memory 112 via memory controller 108. Subsequently, processing circuit 106 receives the cache data from system memory 112 via memory controller 108.

Memory controller 108 manages data going to and from system memory 112. Additionally, in the illustrated implementation, memory controller 108 verifies data integrity and error correction for data stored at system memory 112. The number of MAC circuits, RC decoders, RC encoders, and logic control circuits present in data integrity subsystem 200 represents a tradeoff between parallelization of generation of check bits versus area and power consumption. In the illustrated implementation, memory controller 108 includes a same quantity of MAC circuits, RC encoders, RC decoders, and logic control circuits. However, in other implementations, memory controller 108 includes differing quantities of one or more of MAC circuits, RC encoders, RC decoders, logic control circuits, or any combination thereof.

MAC circuits 210-212 are each configured to perform specified hash functions on received data. In the illustrated implementation, MAC circuits 210-212 are able to perform multiple hash functions. In some implementations, MAC circuits 210-212 only perform a single hash function each. In some cases, MAC circuits 210-212 perform hash functions on portions of received data in parallel. To illustrate, in response to receiving memory device data from system memory 112, MAC circuit 210 performs a first hash function on a first portion of the memory device data and MAC circuit 212 performs the first hash function on a second portion of the memory device data in parallel. Subsequently or in parallel with performing the first hash function, MAC circuit 210 performs a second hash function on check bits received from system memory 112. In some cases, MAC circuits 210-212 perform hash functions on data received from different sources. For example, MAC circuit 210 performs a first hash function on data received from cache line 202 while MAC circuit 212 performs a second hash function on data received from entry 232.

As discussed further below, RC encoders 214-216 and RC decoders 218-220 are used to perform a data integrity verification process. As one example of an RC mechanism, to protect data, RC encoder 214 multiplies a value corresponding to the data with a deliberately chosen multiplier before storing the result in memory. When the result is retrieved from memory, RC decoder 218 divides the retrieved result by the same chosen multiplier. If no errors have occurred between the storage and retrieval, the RC decoder 218 calculates a remainder of zero, thus verifying data integrity. However, if some bits have changed, RC decoder 218 uses the remainder to identify the bits that have changed and are to be corrected.

In the illustrated implementation, RC encoders 214-216 generate check bits from received data in accordance with an RC mechanism. In some cases, the received data is a hash value generated by performing a hash function (e.g., performing a hash function on memory device data received from system memory 112). The number of check bits generated is based on the number of bits that would be generated by a traditional ECC function for entries of system memory 112. In other words, ECC data storages 238 and 240 have a set size corresponding to a size of corresponding data storages 234 and 236. RC encoders generate a number of bits equal to or less than the size of ECC data storages 238 and 240. In some cases, RC encoders 214-216 generate check bits from portions of received data in parallel. In such cases, the number of check bits generated by each RC encoder is proportional to the size of the portion of the received data. For example, in response to receiving cache data from cache line 204, RC encoder 214 generates a first half of check bits from a first half of the cache data and RC encoder 216 generates a second half of the check bits from a second half of the cache data. In some cases, RC encoders 214-216 generate check bits from data received from different sources. For example, RC encoder 214 generates check bits from data received from cache line 202 while RC encoder 216 generates check bits from a hash value received from MAC circuit 210.

RC decoders 218-220 detect, and, in some cases, correct errors in data received from system memory 112. In particular, one or more of RC decoders 218-220 receive memory device data and check bits from system memory 112. The one or more RC decoders 218-220 determine whether the memory device data and check bits indicate data errors. In some cases, in response to detecting data errors, the one or more RC decoders 218-220 determine that the data errors are uncorrectable ECC errors (e.g., enough bits are changed that the one or more RC decoders 218-220 cannot determine which bits are incorrect). In the illustrated implementation, in response to determining that data errors are uncorrectable ECC errors, the one or more RC decoders 218-220 indicate that ECC errors are present to another circuit, such as processing circuit 106. In other cases, the one or more RC decoders 218-220 determine that the data errors are correctable ECC errors. In the illustrated implementation, in response to determining that the data errors are correctable ECC errors, the one or more RC decoders 218-220 correct the data errors. In other implementations, the one or more RC decoders 218-220 always indicate ECC errors (correctable or uncorrectable) to another circuit. Accordingly, in some implementations, the RC decoders 218-220 do not determine whether data errors are correctable. In some cases, RC decoders 218-220 detect, and, in some cases, correct errors in parallel. In some cases, RC decoders 218-220 detect, and, in some cases, correct errors from data received from different sources. Further, in some cases, RC decoders 218-220 detect, and, in some cases, correct errors using respective portions of data stored at an entry of system memory 112 and respective portions of check bits stored at the entry. For example, in response to receiving memory device data and check bits from entry 230, RC decoder 218 analyzes a first half of the memory device data for data errors using a first half of the check bits and RC decoder 220 analyzes a second half of the memory device data for data errors using a second half of the check bits.

As discussed further below with reference to FIGS. 4 and 5, logic control circuits 222-224 generate data integrity information for memory device data by comparing a set of check bits generated from a hash value generated from memory device data to a hash value generated from a set of check bits received from a memory device. As discussed above, the hash functions are selected such that: RC2(HF1(X))=HF2(RC1(X)) where RC1 and RC2 are RC-based functions used to generate the check bits, HF1 and HF2 are hash-based MAC functions, and X is the example data. As a result, if the check bits match the hash value, data integrity is verified. If the check bits do not match the hash value, data integrity is not verified. In some cases, logic control circuits 222-224 determine whether data integrity is verified in parallel (e.g., data integrity of different memory device data stored at different entries). In some cases, logic control circuits 222-224 determine whether data integrity is verified for data received from different sources. Further, in some cases, logic control circuits 222-224 determine whether data integrity is verified using respective portions of data stored at an entry of system memory 112 and respective portions of check bits stored at the entry. For example, in response to memory controller 108 receiving memory device data and check bits from entry 230, logic control circuit 222 determines whether data integrity is verified for a first half of the memory device data and logic control circuit 224 determines whether data integrity is verified for a second half of the memory device data.

System memory 112 includes entries 230-232. Entry 230 includes data storage 234 to store cache data and ECC data storage 238 to store ECC data. Similarly, entry 232 includes data storage 236 to store cache data and ECC data storage 240 to store ECC data. The cache data and ECC data are stored together, so multiple read operations are not performed to retrieve the stored cache data and ECC data. However, in the illustrated implementation, check bits generated using an RC mechanism are stored in ECC data storage 238-240. A quantity of generated check bits is equal to or less than a quantity of ECC bits that would ordinarily be used for an amount of data to be stored at data storage 234. As noted above, although entries 230 and 232 store data and subsequently return the stored data, in some cases, the data provided by system memory 112 to memory controller 108 differs from the data originally stored at the entries (e.g., due to communication errors or noise, data storage errors, changes made by malicious actors, etc.). Accordingly, data verification is desirable. Further, in some cases, error correction is also desirable.

Figure 3:
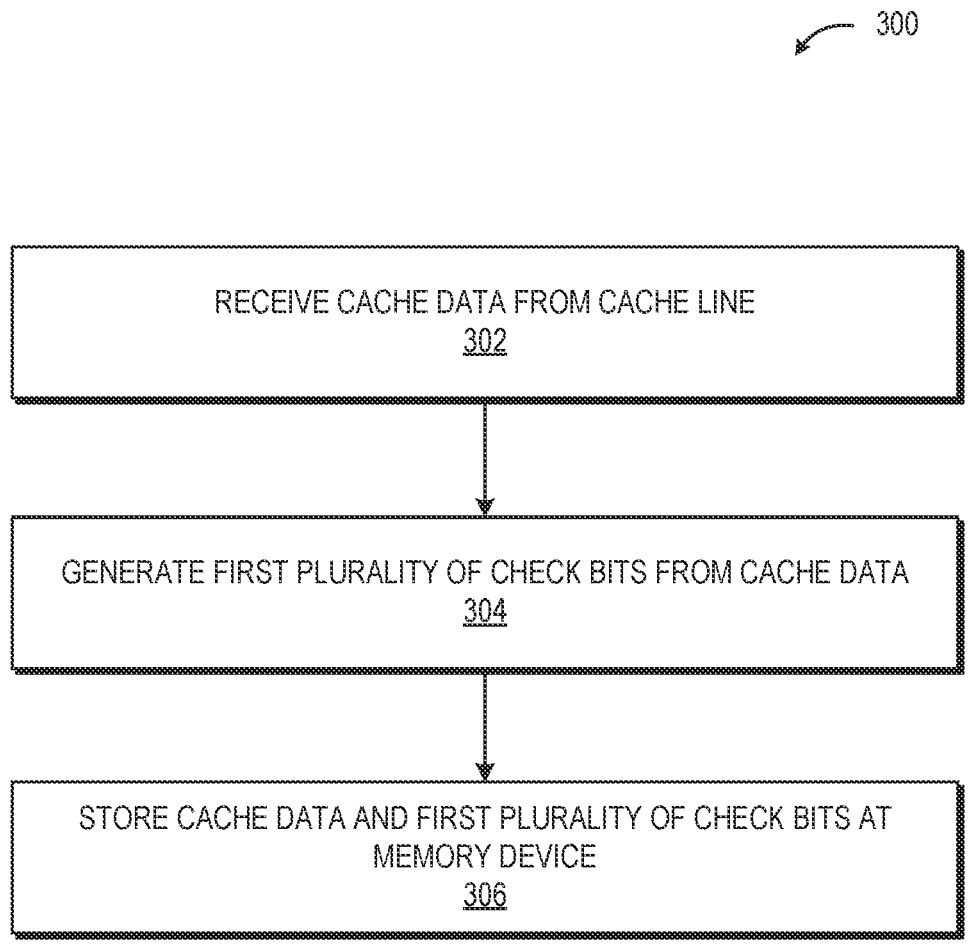
FIG. 3 is a flow diagram of a method of generating and storing data integrity verification information in accordance with some implementations.

FIG. 3 is a flow diagram illustrating a method 300 of generating and storing data integrity verification information in accordance with some implementations. In some implementations, method 300 is initiated by one or more processors in response to one or more instructions stored by a computer readable storage medium.

At block 302, cache data is received from a cache line. For example, memory controller 108 of FIG. 2 receives cache data from cache line 202. At block 304, a first plurality of check bits is generated from the cache data. For example, RC encoder 214 generates a first plurality of check bits from the cache data. At block 306, the cache data and the first plurality of check bits are stored at a memory device. For example, memory controller 108 sends the cache data to be stored at data storage 234 of entry 230 of system memory 112 and sends the first plurality of check bits to be stored at ECC data storage 238 of entry 230. As discussed below with reference to FIG. 4, the first plurality of check bits is subsequently used to verify data integrity of the cache data. Accordingly, a method of generating and storing data integrity verification information is depicted.

In some implementations, various portions of method 300 are performed by multiple components in parallel. For example, in some implementations, block 304 is performed by RC encoders 214-216 on respective portions of the cache data in parallel. In some implementations, method 300 is performed multiple times in parallel. For example, cache data is received from cache line 202 in parallel with cache data being received from cache line 204 and RC encoder 216 performs block 304 using the cache data received from cache line 202 in parallel with RC encoder 214 performing block 304 using the cache data received from cache line 204.

Figure 4:
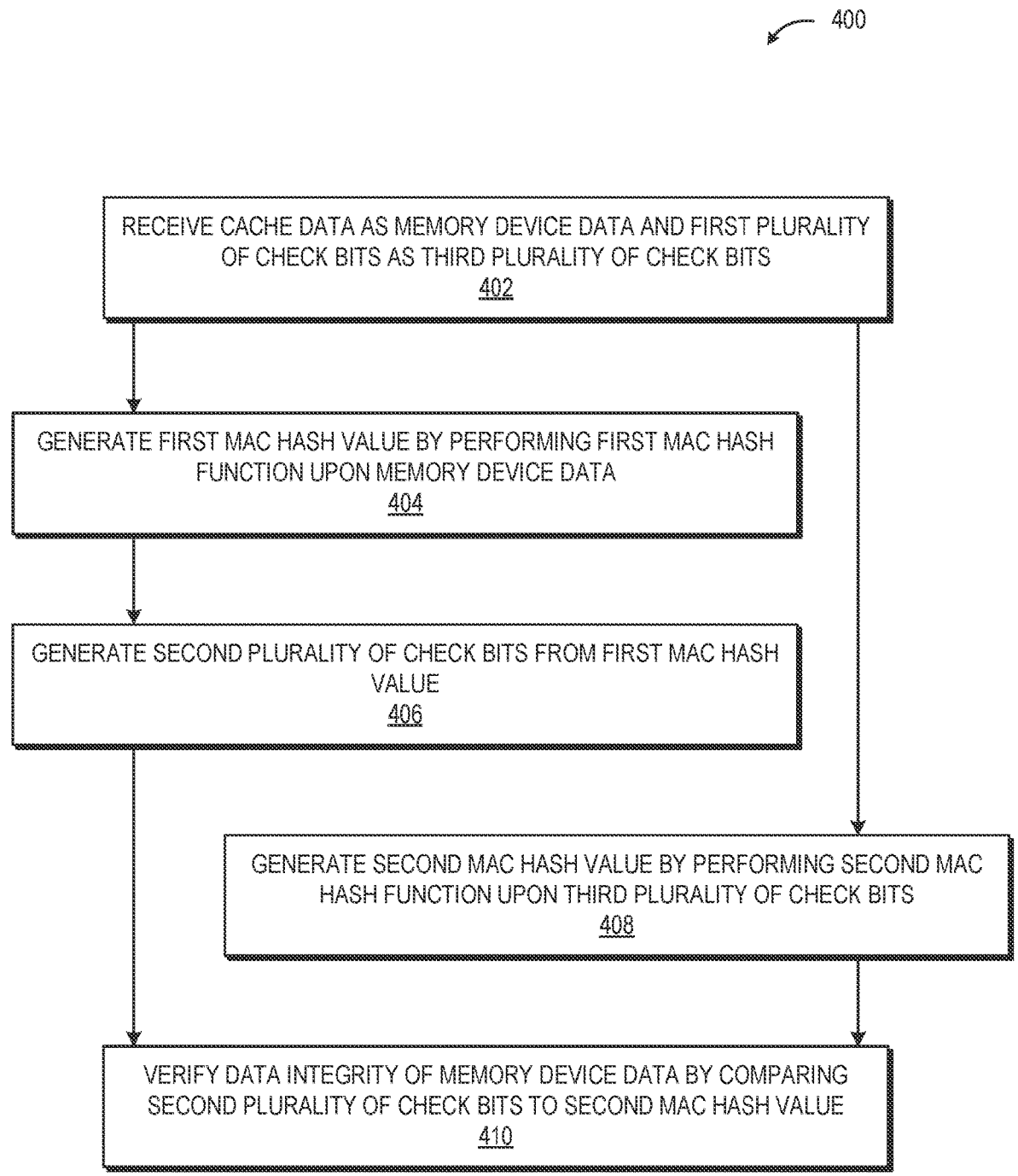
FIG. 4 is a flow diagram of a method of verifying data integrity of data stored at a memory device in accordance with some implementations.

FIG. 4 is a flow diagram illustrating a method 400 of verifying data integrity of data stored at a memory device in accordance with some implementations. In some implementations, method 400 is initiated by one or more processors in response to one or more instructions stored by a computer readable storage medium.

At block 402, cache data is received as memory device data and a first plurality of check bits is received as a third plurality of check bits. As noted above, in some cases, stored cache data, stored check bits, or both differ from retrieved cache data, retrieved check bits, or both. For clarity, the retrieved cache data, the cache data previously stored at the memory device, is referred to herein as memory device data and the retrieved first plurality of check bits, the first plurality of check bits previously stored at the memory device, are referred to herein as a third plurality of check bits. Accordingly, as an example, memory controller 108 of FIG. 2 receives previously stored cache data as memory device data from data storage 234 of entry 230 of system memory 112 and receives a previously stored first plurality of check bits as a third plurality of check bits from ECC data storage 238 of entry 230.

At block 404, a first MAC hash value is generated by performing a first MAC hash function upon the memory device data. For example, MAC circuit 212 generates a first MAC hash value by performing a first MAC hash function upon the memory device data. At block 406, a second plurality of check bits is generated from the first MAC hash value. For example, RC encoder 214 generates a second plurality of check bits from the memory device data.

At block 408, a second MAC hash value is generated by performing a second MAC hash function upon the third plurality of check bits. For example, MAC circuit 212 generates a second MAC hash value by performing a second MAC hash function upon the third plurality of check bits. In some implementations, the first MAC hash function is the same as the second MAC hash function. In other implementations, the first MAC hash function differs from the second MAC hash function.

At block 410, data integrity of the memory device data is verified by comparing the second plurality of check bits to the second MAC hash value. For example, logic control circuit 224 receives the second plurality of check bits from RC encoder 214 and the second MAC hash value from MAC circuit 212 and compares the two values. If the two values match, data integrity of the memory device data is verified. Otherwise, data integrity is not verified. Accordingly, a method of verifying data integrity of data stored at a memory device is depicted.

In some implementations, various portions of method 400 are performed by multiple components in parallel. For example, in some implementations, block 404 is performed by MAC circuits 210-212 on respective portions of the memory device data in parallel. In some implementations, various portions of method 400 are performed in parallel. For example, in some implementations, block 404, block 406, or both are performed in parallel with block 408. In some implementations, method 400 is performed multiple times in parallel. For example, memory device data and a third plurality of check bits are received from entry 230 in parallel with second memory device data and a fourth plurality of check bits being received from entry 232. In the example, MAC circuit 212 performs block 404 using the memory device data received from entry 230 in parallel with MAC circuit 210 performing block 404 using the memory device data received from entry 232.

Figure 5:
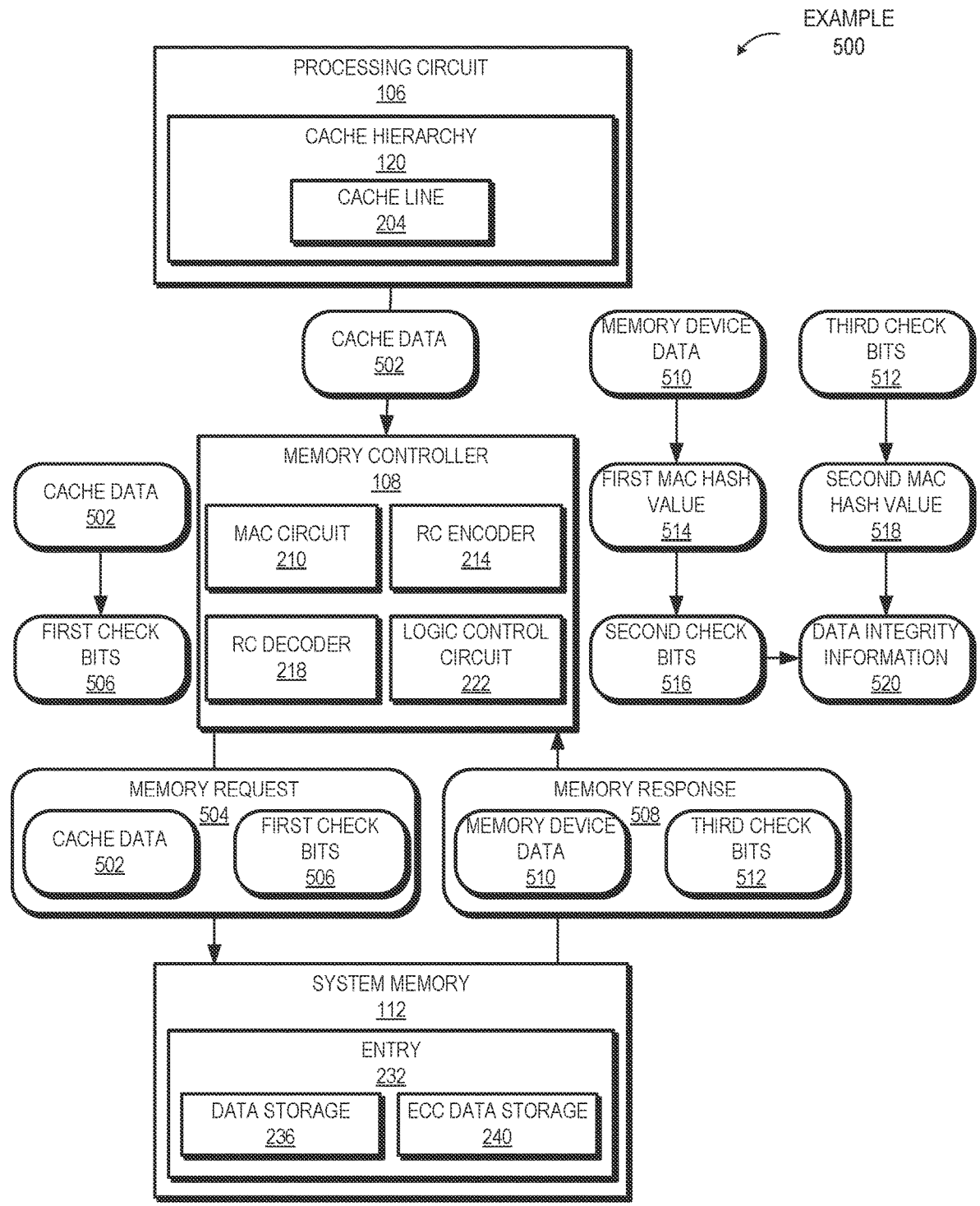
FIG. 5 is a block diagram of an example data integrity verification process in accordance with some implementations.

FIG. 5 illustrates an example 500 data integrity verification process in accordance with at least some implementations. In the illustrated implementation, cache data 502 is sent from cache line 204 of cache hierarchy 120 of processing circuit 106 to entry 232 of system memory 112 for storage via memory controller 108. In response to receiving cache data 502, RC encoder 214 of memory controller 108 generates first check bits 506 using an RC-based mechanism. Memory controller 108 generates memory request 504, including cache data 502 to be stored at data storage 236 of entry 232 and first check bits 506 to be stored at ECC data storage 240 of entry 232.

The stored cache data is subsequently requested by processing circuit 106 (e.g., to be stored at cache line 204 or at another cache line). Accordingly, system memory 112 provides memory response 508. As discussed above, in some cases, at some point between memory request 504 being sent from memory controller 108 to system memory 112 and memory response 508 being received by memory controller 108 from system memory 112, the stored cache data, check bits, or both are changed. Accordingly, memory verification is desirable. For clarity, because cache data 502, first check bits 506, or both could differ subsequent to being stored at and retrieved from system memory 112, the returned cache data of memory response 508, cache data 502 subsequent to being stored at and previously retrieved from system memory 112, is referred to as memory device data 510 and the returned check bits of I/O memory response 508, first check bits 506 subsequent to being stored at and previously retrieved from system memory 112, are referred to as third check bits 512.

In response to receiving memory response 508, MAC circuit 210 generates first MAC hash value 514 from memory device data 510 using a first MAC hash function. MAC circuit 210 also generates second MAC hash value 518 from third check bits 512 using a second MAC hash function. RC encoder 214 generates second check bits 516 from first MAC hash value 514. Logic control circuit 222 generates data integrity information 520 from second MAC hash value 518 and second check bits 516. In particular, if second MAC hash value 518 matches second check bits 516, data integrity information 520 indicates that data integrity is verified for memory device data 510.

Additionally, in some implementations, error correction is also desirable. In such implementations, RC decoder 218 performs ECC functions on memory device data 510 using third check bits 512 as ECC bits. In some cases, the ECC functions include sending ECC error messages to processing circuit 106 in response to detecting ECC errors (e.g., uncorrectable ECC errors or correctable ECC errors). Further, in some cases, the ECC functions include correcting correctable ECC errors. Accordingly, as a result of additional circuitry in memory controller 108 (e.g., MAC circuit 210, RC encoder 214, RC decoder 218, logic control circuit 222, or any combination thereof), data integrity verification and ECC functionality are performed without using additional storage at system memory 112 to store additional data integrity data or taking additional time to perform additional read operations to retrieve the data integrity data.

In some implementations, a computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), or Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some implementations, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. In some implementations, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that, in some cases, one or more further activities are performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that cause any benefit, advantage, or solution to occur or become more pronounced are not to be construed as a critical, required, or essential feature of any or all the claims. Moreover, the particular implementations disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular implementations disclosed above could be altered or modified and all such variations are considered within the scope of the disclosed subject matter. Accordingly, the protection sought herein is as set forth in the claims below.

Within this disclosure, in some cases, different entities (which are variously referred to as "components," "units," "devices," etc.) are described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

What is claimed is:

1. An apparatus comprising:
a residue code (RC) encoder configured to:
generate a first plurality of check bits from cache data received from a cache line, wherein the cache data and the first plurality of check bits are to be stored at a memory device; and
generate a second plurality of check bits from a first message authentication code (MAC) hash value;
a MAC circuit configured to:
generate the first MAC hash value based on the cache data previously stored at the memory device; and
generate a second MAC hash value based on the first plurality of check bits previously stored at the memory device; and
a logic control circuit configured to generate data integrity information for the cache data previously stored at the memory device by comparing the second plurality of check bits to the second MAC hash value.

2. The apparatus of claim 1, wherein the MAC circuit is configured to generate the first MAC hash value by performing a first MAC hash function upon the cache data previously stored at the memory device.

3. The apparatus of claim 2, wherein the MAC circuit is configured to generate the second MAC hash value by performing a second MAC hash function upon the first plurality of check bits previously stored at the memory device.

4. The apparatus of claim 2, wherein the MAC circuit is configured to generate the second MAC hash value by performing the first MAC hash function upon the first plurality of check bits previously stored at the memory device.

5. The apparatus of claim 1, further comprising:
a RC decoder configured to determine whether data errors are present in the cache data previously stored at the memory device by using the first plurality of check bits previously stored at the memory device as error correcting code (ECC) data.

6. The apparatus of claim 5, wherein the RC decoder is further configured to correct the data errors in response to determining that the data errors are present.

7. The apparatus of claim 5, wherein the RC decoder is further configured to indicate that ECC errors are present to a processing circuit in response to determining that the data errors are present and are correctable ECC errors or uncorrectable ECC errors.

8. The apparatus of claim 5, wherein the RC decoder is further configured to indicate that ECC errors are present to a processing circuit in response to determining that the data errors are present and are uncorrectable ECC errors.

9. The apparatus of claim 1, wherein a memory controller comprises RC encoder, the MAC circuit, and the logic control circuit.

10. The apparatus of claim 1, wherein the memory device comprises the RC encoder, the MAC circuit, and the logic control circuit.

11. A method, comprising:
receiving cache data from a cache line;
generating a first plurality of check bits from the cache data;
storing the cache data and the first plurality of check bits at a memory device;
receiving, from the memory device, the cache data as memory device data and the first plurality of check bits as a third plurality of check bits;
generating a first message authentication code (MAC) hash value by performing a first MAC hash function upon the memory device data;
generating a second plurality of check bits from the first MAC hash value;
generating a second MAC hash value by performing a second MAC hash function upon the third plurality of check bits; and
verifying data integrity of the memory device data by comparing the second plurality of check bits to the second MAC hash value.

12. The method of claim 11, further comprising:
correcting one or more errors in the memory device data using the third plurality of check bits as error correcting code (ECC) data.

13. The method of claim 11, wherein generating the first MAC hash value is performed in parallel with generating the second MAC hash value.

14. The method of claim 11, wherein the cache data is a portion of data stored at the cache line.

15. The method of claim 14, further comprising:
receiving second cache data from the cache line;
in parallel with generating the first plurality of check bits, generating a fourth plurality of check bits from the second cache data; and
storing the second cache data and the fourth plurality of check bits at the memory device.

16. The method of claim 15, further comprising:
receiving, from the memory device, the second cache data as second memory device data and the fourth plurality of check bits as a sixth plurality of check bits;
generating a third MAC hash value by performing the first MAC hash function upon the second memory device data;
generating a fifth plurality of check bits from the third MAC hash value;
generating a fourth MAC hash value by performing the second MAC hash function upon the sixth plurality of check bits; and
verifying data integrity of the second memory device data by comparing the fifth plurality of check bits to the fourth MAC hash value.

17. A system comprising:
a memory controller comprising:
a residue code (RC) encoder configured to:
generate a first plurality of check bits from cache data received from a cache line; and
generate a second plurality of check bits from a first message authentication code (MAC) hash value;
a MAC circuit configured to:
generate the first MAC hash value by performing a first MAC hash function upon memory device data; and
generate a second MAC hash value by performing a second MAC hash function upon a third plurality of check bits; and
a logic control circuit configured to generate data integrity information for the memory device data by comparing the second plurality of check bits to the second MAC hash value; and
a memory device configured to store the cache data and the first plurality of check bits, to provide the cache data as the memory device data, and to provide the first plurality of check bits as the third plurality of check bits.

18. The system of claim 17, wherein the memory device is configured to store the cache data in a data storage portion of an entry and the first plurality of check bits in an error correcting code (ECC) data storage portion of the entry.

19. The system of claim 17, further comprising:
a cache hierarchy comprising the cache line.

20. The system of claim 19, wherein the memory device is configured to store the cache data in response to an eviction of the cache data at the cache hierarchy.

* * * * *